United States Patent [19]

Sublett

[11] Patent Number: 5,340,624
[45] Date of Patent: Aug. 23, 1994

[54] SHRINKABLE COPOLYESTER FILM

[75] Inventor: Bobby J. Sublett, Kingsport, Tenn.

[73] Assignee: Eastman Chemical Company, Kingsport, Tenn.

[21] Appl. No.: 106,745

[22] Filed: Aug. 16, 1993

[51] Int. Cl.$^5$ .............................................. B29D 22/00
[52] U.S. Cl. .................................. 428/35.8; 528/272; 528/301; 528/302; 528/307; 528/308.6; 428/357; 428/480
[58] Field of Search ............... 528/272, 301, 302, 307, 528/308.6; 428/357, 35.8, 480

[56] References Cited

U.S. PATENT DOCUMENTS

| | | | |
|---|---|---|---|
| 4,020,141 | 4/1977 | Quinn et al. | 264/289 |
| 4,766,033 | 8/1988 | Yoshimura et al. | 428/332 |
| 5,070,180 | 12/1991 | Fukuda et al. | 528/272 |
| 5,240,779 | 8/1993 | Ono et al. | 428/458 |

*Primary Examiner*—Samuel A. Acquah
*Attorney, Agent, or Firm*—John F. Stevens

[57] ABSTRACT

A shrinkable copolyester film having shrinkage of not less than 30% in either the machine direction or transverse direction after specific heat treatment. The shrinkable copolyester film of the present invention is excellent in shrinkage properties and is substantially free from wrinkles, and uneven shrinkage. The copolyester is useful as a shrinkage label for PET bottles.

6 Claims, No Drawings

SHRINKABLE COPOLYESTER FILM

TECHNICAL FIELD

The present invention relates to a copolyester shrink film excellent in shrinking properties and free from film distortions, wrinkling, and uneven film shrinkage while forming and after being shrunk.

BACKGROUND OF THE INVENTION

Polyester shrink film have become important in the packaging industry, primarily because they can be disposed of by incineration, or recovered and recycled from labels on poly(ethylene terephthalate) (PET) bottles. Shrink films have been improved in the trade by composition modifications and certain processing manipulations.

However, shrink films are still ineffective for practical purposes. Especially when used on such items as rectangular bottles, wrinkling and film distortion are very obvious. The development of a shrinkable polyester film having improved shrinking properties is desired. We have unexpectedly found that an improved polyester shrink film suitable for practical use can be produced using certain copolyester modifications.

Shrinkable copolyester films disclosed in U.S. Pat. No. 5,070,180 do not use cycloaliphatic acids, such as 1,4-; 1,2-; and 1,3-cyclohexanedicarboxylic acid and their cis/trans isomer mixtures. Two other U.S. Pat. Nos. 4,766,033 and 4,020,141 discuss attempts to prepare copolyester shrink film. However, none of these patents address the copolyester compositions disclosed in this invention. We have discovered that the use of the cycloaliphatic carboxylic acids and their esters impart a significant degree of improved color, thermal stability and weatherability.

SUMMARY OF THE INVENTION

This invention concerns a shrinkable copolyester film comprising a copolyester having repeat units from about 70 to 99 mole percent, based on the total moles of acids, of terephthalic acid or dimethyl terephthalate. About 1 to 30 mole percent, based on the total moles of acids, of a cycloaliphatic dicarboxylic acid is selected. The cycloaliphatic dicarboxylic acid is selected from the following monomers including: 1,2-cyclohexanedicarboxylic acid, 1,3-cyclohexanedicarboxylic acid, and 1,4-cyclohexanedicarboxylic acid. Also, the cis/trans isomers of each of the compounds where the isomer ratio ranges from 100% trans to 100% cis isomer and all mixed isomer concentrations in between can be present.

The glycol portion of the polyester comprises about 70 to 99 mole percent based on the total moles of diols of ethylene glycol. About 1 to 30 mole percent of a diol selected from the group consisting of diethylene glycol, polyethylene glycol, propylene glycol, 1,4-cyclohexanedimethanol, hexamethylene glycol, 1,4-butanediol, and neopentyl glycol.

The shrinkage of the film in the direction of either the machine direction or the transverse direction after heat treatment at 100° C. for 5 minutes is not less than about 30 percent. The glass transitions temperature of the film is about 35° C. to 70° C.

DESCRIPTION OF THE INVENTION

This invention relates to shrink film comprising copolyesters in which about 70 to 99 percent of the total dicarboxylic acids or their esters is terephthalic acid. Preferably about 80 percent of the total dicarboxylic acids or their esters is terephthalic acid. The remaining dicarboxylic acid used about 1 to 30 mole percent as a comonomer in the present invention include the 1,2-; 1,3-; and 1,4-isomers of cyclohexanedicarboxylic acid with cis/trans isomers ranging from 100 percent trans to 100 percent cis and all combinations in between. The most preferred compound is dimethyl-1,4-cyclohexanedicarboxylate which is approximately 60 percent cis isomer and 40 percent trans isomer.

Diols are used as comonomers in the present invention. Examples include ethylene glycol, propylene glycol, 1,4-butanediol, hexamethylene glycol, 1,4-cyclohexanedimethanol, and diethylene glycol. The preferred glycol combination is about 20 mole percent diethylene glycol or 1,4-cyclohexanedimethanol and about 80 mole percent ethylene glycol. The preferred percentages of selected glycol component of the copolyester of this invention are about 70 to 99 mole percent ethylene glycol and about 1 to 30 mole percent comonomers selected from diethylene glycol, 1,4-cyclohexanedimethanol, propylene glycol, hexamethylene glycol, and 1,4-butanediol. The most preferred comonomers are diethylene glycol and 1,4-cyclohexanedimethanol.

The glycol and dicarboxylic acids are especially preferred to lower the glass transition temperature (Tg) of the copolymer. They also preserve crystallinity in the copolymer. The I.V. of the film of this invention is about 0.40 to 1.1. The preferable I.V. is about 0.65 to 0.95. The glass transition temperature is preferably between about 35° C. and 70° C.

The process for producing the film is exemplified as follows.

A reaction vessel is charged with the appropriate mole percentages of dimethyl terephthalate, 60/40 cis/trans isomer of the acid monomer dimethyl-1,4-cyclohexanedicarboxylate, 70/30 trans/cis isomer of 1,4-cyclohexanedimethanol, and ethylene glycol. In addition, suitable amounts of manganese diacetate solution in ethylene glycol, an n-butanol solution of Titanium tetraisopropoxide, and cobalt acetate are added all under a blanket of nitrogen. The mixture is then stirred for 1.5 hours at 200° C. and 1 hour at 210° C.

After this time the theoretical amount of methanol is collected and a conventional phosphorus-containing stabilizer is added. The reaction vessel's temperature is increased to 280° C., the nitrogen is shut off, and the vessel's pressure is reduced to 0.1 mm Hg. The temperature is maintained at 280° C. with stirring at the reduced pressure for 1.5 hours.

Finally, the vessel is allowed to come to atmospheric pressure, and 25° C. temperature under a nitrogen blanket. The melt phase copolyester is ready to be converted to film.

The copolyester is extruded and an amorphous film of about 8 mils in thickness is obtained. The film is properly aligned in a TM Long (Trademark) machine for biaxial stretching. The stretching can be carried out in either the machine or transverse direction by 2–4 times. Preferably, at a 4 to 1 ratio at 70° C. in the machine direction. The result is a film with a thickness of 2 mils. In addition, the film can be stretched in either the machine or the transverse direction, or stretching can be performed in both directions depending on the desired application.

The film shrinkage in the direction perpendicular to the main shrink direction should be between about 20 and 80 percent of the shrinkage in the main direction. Such shrinkage occurs if the film is stretched in one direction or in both directions as long as the film is stretched more in one direction. The preferred film should have a main shrinkage between about 40 and 70 percent depending on the shrink temperature and the application. The film shrinkage was performed on a TM Long machine which is a conventional biaxial film stretcher well known to those in the art.

In general, the film may be applied to any container surface. For example, for a glass wine bottle the film is placed over the glass so it conforms to the shape. The bottle with film are placed in an oven and the temperature is raised until the film adheres to the glass surface. This a non-limiting use of the film's application. Other uses can be logically extended from this invention.

This invention does not exclude the addition of organic and inorganic materials such as pigments, antistats, antioxidants, defoaming agents, and lubricants to the polymer or to the reaction mixture. Examples of polymer additives are kaolin, clay, calcium carbonate, titanium dioxide, etc.

The glass transition temperature (Tg) test was carried out in accordance with ASTM E-1356-91. This procedure is well known in the art.

Inherent viscosity is measured at 25° C. using 0.5 g polymer per 100 ml of a solvent consisting of 60% by weight phenol and 40% by weight tetrachloroethane. The basic method is set forth in ASTM D-2857-70.

The following non-limiting examples are submitted to illustrate the preparation of the compositions of this invention.

EXAMPLE 1

Typical Copolyester Preparation

A 500 ml round-bottom flask equipped with a ground glass head, a stirrer shaft, a nitrogen inlet and a side arm. The flask is charged with 77.6 grams (0.40 moles) of dimethyl terephthalate, 20 grams (0.10 moles) of 60/40 cis/trans dimethyl-1,4-cyclohexanedicarboxylate, 14 grams (0.075 moles) of 70/30 trans/cis isomer 1,4-cyclohexanedimethanol, 62 grams (1.0 moles) of ethylene glycol. In addition, 0.90 ml of manganese diacetate solution in ethylene glycol containing 0.0049 g/ml manganese, 0.46 ml of n-butanol solution of Titanium tetraisopropoxide containing 0.001136 g/ml titanium, 1.30 ml of cobalt acetate containing 0.0048 g/ml of cobalt.

The flask is then immersed in a Belmont (Trademark) metal bath and is heated with stirring for 1.5 hrs at 200° C. and 1 hr at 210° C. After this time, the theoretical amount of methanol has been collected and 1.05 ml of phosphorus stabilizer containing 0.1008 g/ml of phosphorus is added to the reaction mixture. The temperature of the bath is increased to 280° C., the nitrogen inlet is clamped off and the pressure in the flask is reduced to 0.1 mm of Hg.

The temperature is maintained at 280° C. with stirring at the reduced pressure for 90 minutes. The metal bath is then lowered away from the flask, the vacuum outlet is clamped off, the nitrogen inlet is opened and the flask is allowed to come to atmospheric pressure under a nitrogen blanket. The copolymer is allowed to cool to room temperature. This melt phase prepared polyester has an inherent viscosity of 0.80. This a is a typical laboratory preparation.

EXAMPLE 2

A 50 lb batch of copolyester consisting of 85 mole percent terephthalic acid units, 15 mole percent of 60/40 cis/trans 1,4-cyclohexanedicarboxylic acid units, 80 mole percent ethylene glycol units and 20 moles of diethylene glycol units with an I.V. of 0.76 was prepared via the general procedure described in Example 1. The copolyester was extruded into a sheet 8 mils in thickness. The film was stretched in the machine direction at 70° C. on a TM Long machine at a 4 to 1 ratio and the stretched film had a thickness had a thickness of 2 mils. Data for this film is shown in Tables 1 and 2.

EXAMPLE 3

A 50 lb batch of copolyester consisting of 80 mole percent terephthalate units, 20 mole percent of 60/40 cis/trans 1,4-cyclohexanedicarboxylate, 85 mole percent ethylene glycol, and 15 mole percent diethylene glycol units with an I.V. of 0.74 was prepared via the general procedure described in Example 1. The copolyester was extruded into a sheet 8 mils thick. The film was stretched in the machine direction at 70° C. on a TM Long machine at a 4 to 1 stretch ratio. The stretched film has a thickness of 2 mils. Data for this film is shown in Tables 1 and 2.

EXAMPLE 4

A 50 lb batch of copolyester consisting of 80 mole percent terephthalic units, 20 mole percent of 100% trans 1,4-cyclohexanedicarboxylate, 90 mole percent ethylene glycol, and 10 mole percent diethylene glycol was prepared by the general procedure described in Example 1. The copolyester had an I.V. of 0.75. The copolyester was extruded into an 8 mils film. The film was stretched in the machine direction to a 4 to 1 ratio into a 2 mils film at 70° C. using a TM Long machine. Data for this example is shown on Tables 1 and 2.

EXAMPLE 5

A 50 lb batch of copolyester, consisting of 70 mole percent terephthalic acid units, 30 mole percent of 60/40 cis/trans 1,4-cyclohexanedicarboxylic acid units, 90 mole percent of ethylene glycol and 10 mole percent diethylene glycol was prepared by the general procedure described in Example 1. The copolyester had an I.V. of 0.81. The copolyester was extruded into an 8 mils film. The film was stretched in the machine direction to a 4 to 1 ratio at 70° C. into a 2 mils thick film using a TM Long machine. Data for this example is shown in Tables 1 and 2.

EXAMPLE 6

A 50 lb batch of copolyester, consisting of 70 mole percent terephthalic units, 30 mole percent of 100% trans 1,4-cyclohexanedicarboxylate units, 90 mole percent of ethylene glycol, and 10 mole percent of diethylene glycol was prepared using the general procedure described in Example 1. The copolyester had an I.V. of 0.80. The copolyester was extruded into an 8 mils film. The film was stretched in the machine direction to a 4 to 1 ratio at 70° C. into a 2 mils film using a TM Long machine. Data for this example is shown in Tables 1 and 2.

EXAMPLE 7

A 50 lb batch of copolyester, consisting of 70 mole percent terephthalic units, 30 mole percent of 60/40 cis/trans 1,4-cyclohexanedimethanol, 85 mole percent of ethylene glycol and 15 mole percent of 1,4-cyclohexanedimethanol was prepared via the general procedure described in Example 1. The copolyester had an I.V. of 0.75. The copolyester was extruded into an 8 mils film. The film was stretched in the machine direction on a TM Long machine at a 4 to 1 ratio at 70° C. into a 2 mils film. Data for this example is example is shown in Tables 1 and 2.

EXAMPLE 8

A 50 lb batch of copolyester, consisting of 85 mole percent terephthalic units, 15 mole percent of 60/40 cis/trans 1,4-cyclohexanedicarboxylate units, 80 mole percent of ethylene glycol and 20 mole percent 1,4-cyclohexanedimethanol 70/30 trans/cis was prepared via the general procedure described in Example 1. The copolyester had an I.V. of 0.74. The copolyester was extruded into an 8 mils film. The film was stretched at a 4 to 1 ratio in the machine direction at 80° C. into a 2 mils film using a TM Long machine. Data for this example is shown in Tables 1 and 2.

EXAMPLE 9

A 50 lb batch of copolyester, consisting of 90 mole percent terephthalic units, 10 mole percent of 100% trans 1,4-cyclohexanedicarboxylate units, 80 mole percent of ethylene glycol and 20 mole percent of 1,4-cyclohexanedimethanol 70/30 trans/cis was prepared via the general procedure described in Example 1. The copolyester had an I.V. of 0.78. The copolyester was extruded into an 8 mils film. The film was stretched in the machine direction on a TM Long machine to a 4 to 1 ratio at 80° C. into a 2 mils film. Data for this example is shown in Tables 1 and 2.

Each of the films prepared in Example 1 through 9 were tested for shrinkage by the following procedure:

The specimen were placed in a free shrink holder, free from contact with the edges of the holder, and immersed in a constant temperature water bath for 30 seconds of 60°, 65°, 70°, 75°, 80°, 85° and 90° C. respectively. The specimen were then removed from the water bath and quickly dried with wipes at room temperature. The thermal shrinkage in the stretch direction is then recorded by measuring the linear dimension, L in millimeters, of the specimen. The temperature of the bath was also recorded. A minimum of 2 specimen are necessary for each test temperature in accordance with ASTM D-2732-83. The percent free shrinkage is then calculated as follows:

$$S, \% = 100 - L$$

wherein S is shrinkage. Shrink values were developed for Examples 2 through 9 and are shown in Table 2. The shrink values correspond to the bath temperatures and are approximated.

Properties of the polymers described in Examples 2 through 9 are shown in Table 1. The data in Tables 1 and 2 illustrate the properties and shrinkage performance of excellent shrink film with the proper shrinkage profile, even shrinkage (no wrinkles) and the appropriate thermal properties for excellent shrink film materials.

TABLE 1

| Example Number | I.V. | Tg (°C.) | Color | Wrinkle |
|---|---|---|---|---|
| 2 | 0.76 | 55 | Clear-White | None |
| 3 | 0.74 | 53 | Clear-White | None |
| 4 | 0.75 | 60 | Clear-White | None |
| 5 | 0.81 | 51 | Clear-White | None |
| 6 | 0.80 | 52 | Clear-White | None |
| 7 | 0.75 | 67 | Clear-White | None |
| 8 | 0.74 | 65 | Clear-White | None |
| 9 | 0.78 | 68 | Clear-White | None |

TABLE 2

| EXAMPLE | TEMP. (°C.) | % SHRINKAGE |
|---|---|---|
| 2 | 50 | 6 |
| 2 | 55 | 26 |
| 2 | 60 | 34 |
| 2 | 65 | 40 |
| 2 | 70 | 43 |
| 2 | 75 | 48 |
| 2 | 80 | 58 |
| 2 | 85 | 63 |
| 2 | 90 | 65 |
| 3 | 50 | 15 |
| 3 | 55 | 27 |
| 3 | 60 | 42 |
| 3 | 65 | 45 |
| 3 | 70 | 50 |
| 3 | 75 | 50 |
| 3 | 80 | 52 |
| 3 | 85 | 58 |
| 3 | 90 | 65 |
| 4 | 50 | 2 |
| 4 | 55 | 12 |
| 4 | 60 | 19 |
| 4 | 65 | 30 |
| 4 | 70 | 35 |
| 4 | 75 | 31 |
| 4 | 80 | 41 |
| 4 | 85 | 43 |
| 4 | 90 | 53 |
| 5 | 50 | 27 |
| 5 | 55 | 42 |
| 5 | 60 | 47 |
| 5 | 65 | 50 |
| 5 | 70 | 51 |
| 5 | 75 | 53 |
| 5 | 80 | 58 |
| 5 | 85 | 64 |
| 5 | 90 | 70 |
| 6 | 50 | 28 |
| 6 | 55 | 42 |
| 6 | 60 | 42 |
| 6 | 65 | 46 |
| 6 | 70 | 49 |
| 6 | 75 | 51 |
| 6 | 80 | 55 |
| 6 | 85 | 64 |
| 6 | 90 | 69 |
| 7 | 55 | 0 |
| 7 | 60 | 8 |
| 7 | 65 | 20 |
| 7 | 70 | 28 |
| 7 | 75 | 39 |
| 7 | 80 | 43 |
| 7 | 85 | 49 |
| 8 | 55 | 3 |
| 8 | 60 | 10 |
| 8 | 65 | 22 |
| 8 | 70 | 29 |
| 8 | 75 | 35 |
| 8 | 80 | 42 |
| 8 | 85 | 51 |
| 9 | 55 | 0 |
| 9 | 60 | 20 |
| 9 | 65 | 32 |
| 9 | 70 | 39 |
| 9 | 75 | 42 |
| 9 | 80 | 46 |

TABLE 2-continued

| EXAMPLE | TEMP. (°C.) | % SHRINKAGE |
| --- | --- | --- |
| 9 | 85 | 52 |

Other modifications and variations of the present invention are possible in the light of the aforementioned teachings. It is to be understood that changes may be made in the particular embodiment described which will be within the full intended scope of the invention as defined by the appended claims.

I claim:

1. A shrinkable copolyester film comprising a copolyester derived from about 70 to 99 mole percent, based on the total moles of acids, of terephthalic acid or dimethyl terephthalate, about 1 to 30 mole percent, based on the total moles of acids, of a cycloaliphatic dicarboxylic acid selected from at least one of the monomers 1,2-cyclohexanedicarboxylic acid, 1,3-cyclohexanedicarboxylic acid, 1,4-cyclohexanedicarboxylic acid, about 70 to 99 mole percent, based on the total moles of diols, of ethylene glycol, about 1 to 30 percent of said diol selected from the group consisting of diethylene glycol, polyethylene glycol, propylene glycol, 1,4-cyclohexanedimethanol, hexamethylene glycol, 1,4-butanediol, and neopentyl glycol, the shrinkage of said film in the machine direction or transverse direction after heating at 100° C. for 5 minutes being not less than about 30 percent, the inherent viscosity of said film being about 0.40 to about 1.1, and the glass transition temperature of said film being about 35° to about 70° C.

2. The shrinkable copolyester film of claim 1, wherein about 80 mole percent of the total of said dicarboxylic acids or their esters is said terephthalic acid or esters thereof.

3. The shrinkable copolyester film of claim 1, wherein 20 mole percent of said composition is comprised of said diol diethylene glycol or said 1,4-cyclohexanedimethanol with an isomer further comprised of a 70-99 percent trans and 1-30 percent cis configuration.

4. The shrinkable copolyester film of claim 1, wherein said film shrinkage of said film in direction perpendicular to the main shrink direction is between about 40 to 70 percent depending on the shrink temperature and the application.

5. The shrinkable copolyester film of claim 1, wherein the inherent viscosity of said film is about 0.65 to about 0.95.

6. The shrinkable copolyester film of claim 1, wherein said film adheres to an article of manufacture.

* * * * *